US006179004B1

(12) United States Patent
Davis, Jr.

(10) Patent No.: US 6,179,004 B1
(45) Date of Patent: Jan. 30, 2001

(54) VACUUM HOLDER FOR AUTOMATED CARTON ERECTING MACHINE

(75) Inventor: Ellis W. Davis, Jr., Deerwood, MN (US)

(73) Assignee: Davis Engineering LLC, Deerwood, MN (US)

( * ) Notice: Under 35 U.S.C. 154(b), the term of this patent shall be extended for 0 days.

(21) Appl. No.: 09/289,932

(22) Filed: Apr. 12, 1999

Related U.S. Application Data

(60) Continuation of application No. 09/259,581, filed on Mar. 1, 1999, now abandoned, which is a division of application No. 08/718,142, filed on Sep. 18, 1996.

(60) Provisional application No. 60/022,110, filed on Jul. 17, 1996.

(51) Int. Cl.[7] ........ F16K 11/74

(52) U.S. Cl. ........ 137/625.21; 137/625.15; 251/175

(58) Field of Search ........ 137/625.11, 625.15, 137/625.21; 251/175

(56) References Cited

U.S. PATENT DOCUMENTS

| | | | |
|---|---|---|---|
| 2,609,736 | 9/1952 | Montgomery | 93/49 |
| 2,710,566 | 6/1955 | Ahlmeyer et al. | 93/49 |
| 2,782,695 | 2/1957 | Meissner et al. | 93/53 |
| 2,918,938 | * 12/1959 | Kimball | 137/625.15 X |
| 2,936,681 | 5/1960 | Earp . | |
| 2,996,083 | * 8/1961 | Huska | 251/175 X |
| 3,131,605 | * 5/1964 | La Borde | 137/625.15 |
| 3,198,004 | * 8/1965 | Roberts et al. | 137/625.15 X |
| 3,599,541 | 8/1971 | Allen . | |
| 3,613,904 | 10/1971 | Blatt | 214/1 BV |
| 3,633,470 | 1/1972 | Ginham . | |
| 3,937,131 | 2/1976 | Kellogg . | |
| 4,194,442 | 3/1980 | Martelli . | |
| 4,509,555 | * 4/1985 | Stirbis | 137/625.11 |
| 4,643,633 | 2/1987 | Lashyro . | |
| 4,700,745 | * 10/1987 | Ellis | 137/625.11 |
| 4,735,600 | 4/1988 | Drewke | 493/314 |
| 4,881,934 | 11/1989 | Harston | 493/315 |
| 4,902,195 | 2/1990 | Ziegler | 414/732 |
| 4,917,663 | 4/1990 | Pazdernik | 493/416 |
| 5,104,369 | 4/1992 | Calvert | 493/315 |
| 5,106,359 | 4/1992 | Lott | 493/125 |
| 5,125,637 | 6/1992 | Glaser | 271/11 |
| 5,207,630 | 5/1993 | Decker | 493/313 |
| 5,298,008 | 3/1994 | Decker | 493/313 |
| 5,456,570 | 10/1995 | Davis et al. | 414/742 |
| 5,514,068 | 5/1996 | Calvert | 493/315 |
| 5,531,661 | 7/1996 | Moncrief | 493/313 |
| 5,562,581 | 10/1996 | Roberto | 493/310 |
| 5,603,599 | 2/1997 | Wesslen | 414/411 |
| 5,662,577 | 9/1997 | Rueteler | 493/315 |
| 5,810,049 | * 9/1998 | Raque et al. | 137/625.11 |

* cited by examiner

*Primary Examiner*—John Rivell
(74) *Attorney, Agent, or Firm*—Westman, Champlin & Kelly, P.A.

(57) ABSTRACT

A vacuum holder for use with an automated carton erecting and packing line and mountable on a rotary carton placer for removing cartons into which product is to be placed includes vacuum cup for removing a carton from a store of cartons. The cartons including a foldable flap. The vacuum holder includes a set of vacuum cups that will engage a flap and at an appropriate time in the carton erection sequence will be positively actuated under control of a power actuator to fold the flap to a desired position prior to depositing the carton on a conveyor line. A rotary manifold carries both vacuum for vacuum cups holding the carton, and fluid pressure for the power actuators to the rotating carton placer.

11 Claims, 12 Drawing Sheets

VACUUM HOLDER FOR AUTOMATED CARTON ERECTING MACHINE

CROSS REFERENCE TO RELATED APPLICATIONS

This application is a continuation of U.S. application Ser. No. 09/259,581, filed Mar. 1, 1995, now abandoned, which is a divisional of U.S. application Ser. No. 08/718,142, filed Sep. 18, 1996, which referred to and claimed priority on U.S. Provisional Application Ser. No. 60/022,110, filed Jul. 17, 1996, which claim of priority is continued.

BACKGROUND OF THE INVENTION

The present invention relates to a vacuum cup carton handler for a carton loading machine which has a handling section that will bend a flap on a carton to be filled along its score line automatically before depositing the carton onto a conveyor for inserting product.

Rotary placers have long been used for handling cartons and carton loading machines. One such device is shown in U.S. Pat. No. 5,456,570. It includes a vacuum holder for receiving cartons from a store or supply, and then moves the carton to a position where it will be deposited on a conveyor for subsequent loading of products into the carton. Vacuum cups are used for holding the carton while the rotary placer moves the carton to the conveyor, and then a control is used for releasing the vacuum so that the carton can be moved along the conveyor. However, U.S. Pat. No. 5,456,570 does not include any structure for positively moving or "breaking" a carton flap between two positions.

Carton formation systems of various kinds have been used for erecting cartons so that they can be appropriately packed, and for example U.S. Pat. No. 5,106,359 shows such a provision. The present invention fulfills a need for properly breaking or bending a carton flap along a score line for ease in subsequent handling and loading.

SUMMARY OF THE INVENTION

The present invention relates to a vacuum gripper used for handling cartons, and which is preferably mounted onto a rotary type placer that will pick a carton at a store station, and will move the carton to a station where it will be released onto a conveyor so that the carton can subsequently be packed. The carton is preferably erected at the time it is deposited on the conveyor, and normally this is done by "breaker bars" or other devices that will engage the carton and cause the carton to be folded from a flat position to an erected position. Cartons have to be closed after they are filled, and normally flaps are provided on at least some of the side panels of the carton along score lines which permit folding the flaps from a flat position to an "open" position where it does not cover the end of the carton.

The present handler includes an auxiliary set of vacuum cups that will engage a carton flap, and by actuation of a power actuator, in the form shown, a pneumatic cylinder operated under air pressure, will be moved through a linkage to bend a carton flap substantially 90° about its score line. The flap will then be in an open position when deposited on a conveyor and thereafter can be maintained in such position by guides on the conveyor.

The present placer includes the provision of both vacuum and air pressure to the rotary carton handler disclosed, so that the operation of the power actuator can be at any desired annular location in the rotation of the unit. As shown, a vacuum and air pressure slip ring assembly is mounted onto a mounting shaft of the rotary placer on which the carton handling device of the present invention is used, using interfacing surfaces, one stationary and one rotating, that will provide a vacuum and air pressure seal between a stationary member and a rotating member that rotates with the rotary placer. The provision of both vacuum and air pressure to control the handling of the carton provides an efficient way of having actuators mounted on a rotating element for carton manipulation. The manifold forms an important part of the invention.

DETAILED DESCRIPTION OF THE PREFERRED EMBODIMENTS

Figure 1:
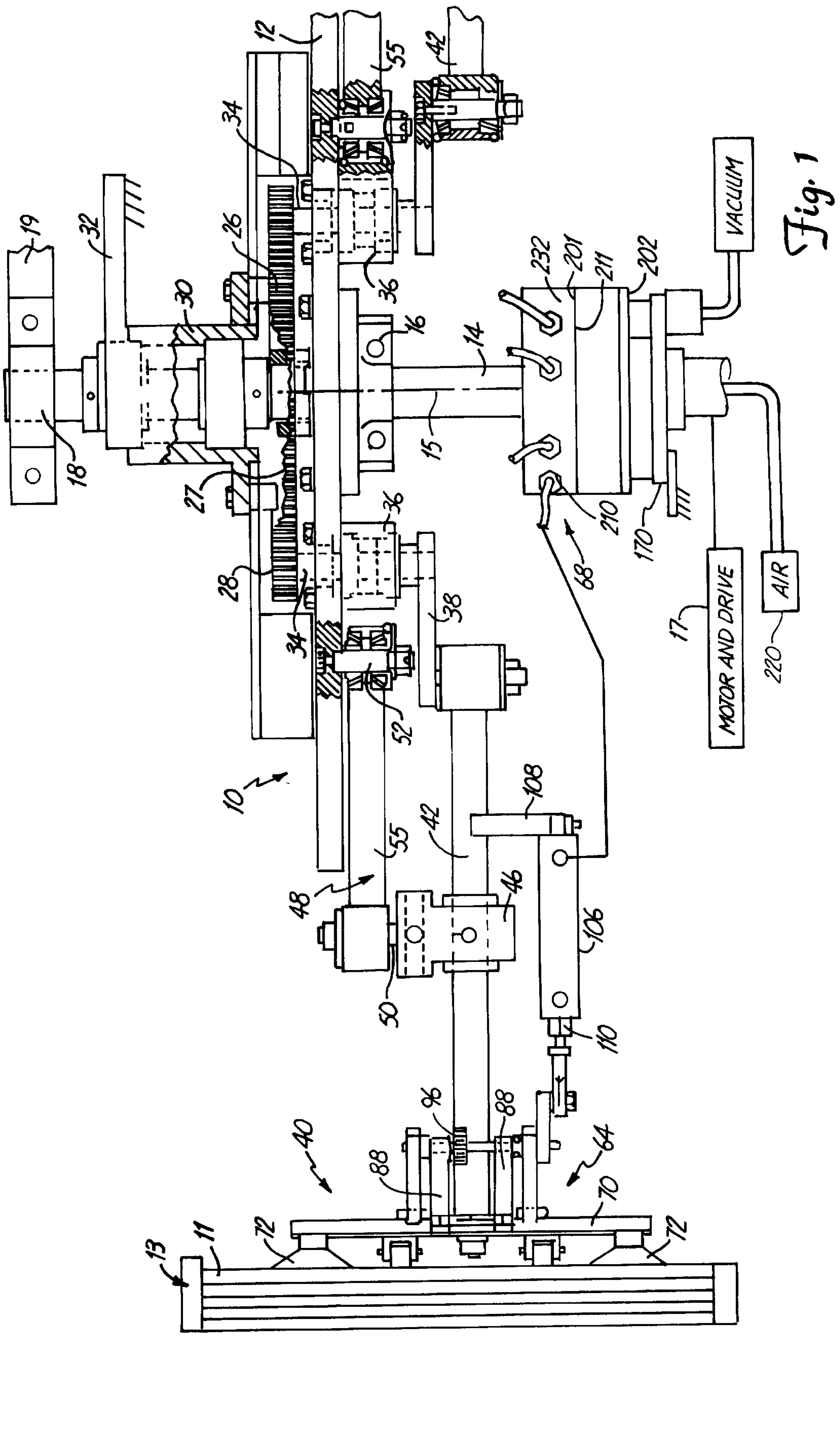
FIG. 1 is a schematic view of a rotary placer having a carton erecting assembly made according to the present invention installed thereon.
Figure 2:
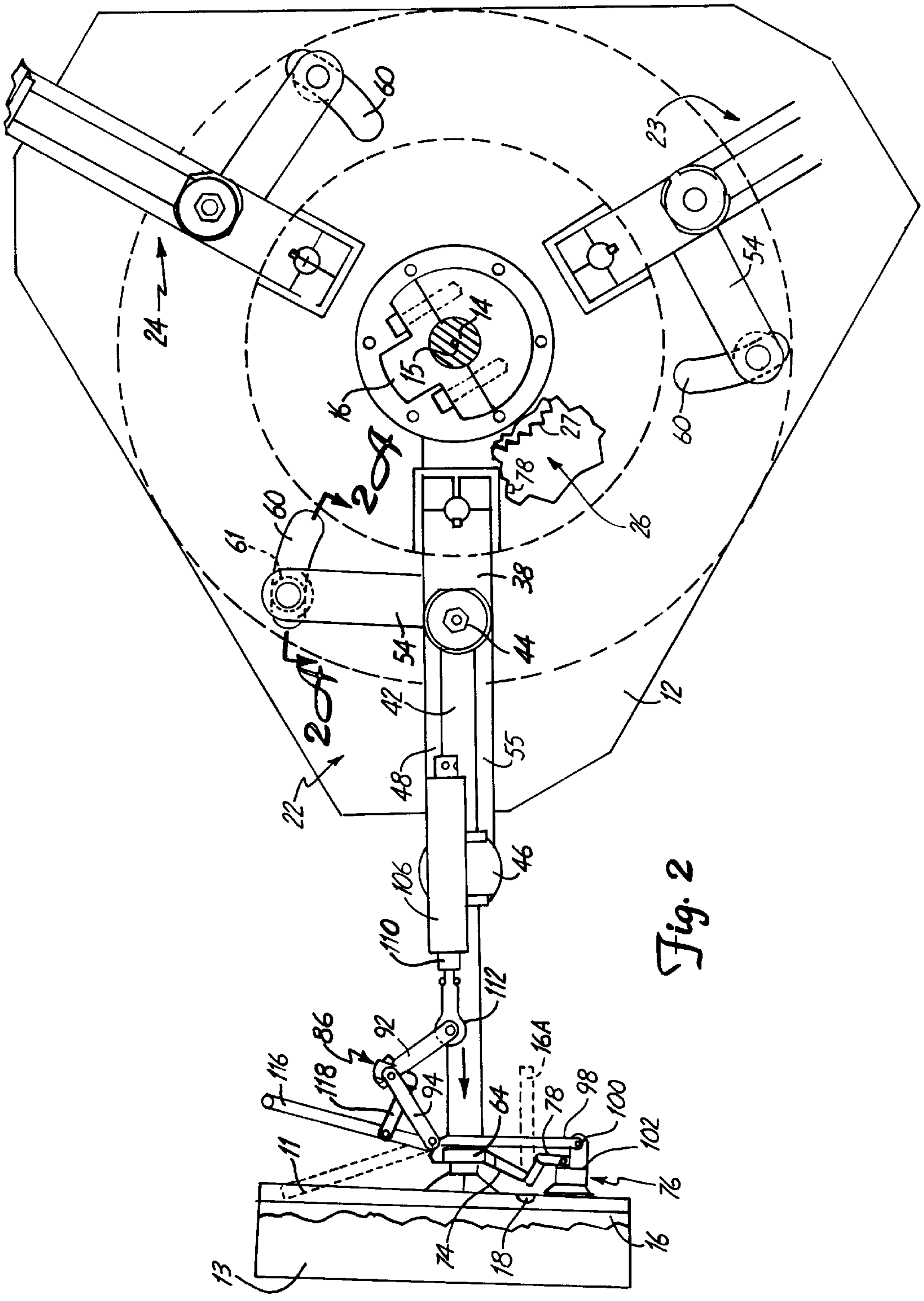
FIG. 2 is a side elevational view of the device of FIG. 1 schematically shown with parts in section and parts broken away.

While the particular type of rotary placer that is utilized is not essential or part of the invention, the rotary placer is partially shown in FIGS. 1 and 2 schematically. Rotary placer 10 is to be used to pick up a carton or other item 11 in a desired position, called a "pick" position from a supply or store 13 having a plurality of cartons and moves the carton to a conveyor that is shown only schematically in FIG. 6 at a place position to place a carton on the conveyor for opening and filling. The rotary placer 10 has a frame 12 mounted on a shaft 14 for rotation about a central axis indicated generally at 15. A hub 16 and suitable locking members drivably connect the frame 12 to the shaft 14. Motor and drive 17 rotates the shaft 14 and thus the frame 12 about the central axis 15. The shaft 14 is mounted on suitable bearings 18 to the machine frame 19 shown only schematically. The pick and place positions are at desired locations to fit the carton loading machine used.

As shown, the frame 12 includes three sections for mounting three separate arm assemblies 22, 23 and 24, respectively 120° apart. There can be two or more, for example up to eight arms assemblies on the frame. Only one arm assembly is shown completely, but it is to be understood that each of the arm assemblies is constructed identically. The arm assemblies 22, 23 and 24 are controlled in their motion during rotation of the frame 12, by a gear set shown generally at 26, which includes a fixed gear 27 and planet gears 28 that are mounted on suitable shafts which will rotate on bearings relative to the frame 12. The fixed gear 27 is supported on a hub 30 that is mounted through bearings to the shaft 14 and then held from rotation in a suitable manner, as shown schematically with an arm 32 that is supported relative to the machine frame 19 in a suitable manner. The shaft 14 thus can rotate relative to the gear 27. The planet gears 28, as shown, are mounted on suitable shafts 34 and bearing housings 36 mounted on the frame 12. The planet gears 28 rotate about the central or sun gear 27 when the frame 12 is rotated, and as they do, they also rotate about the axis of the shafts 34 in a known manner. It should be noted that the gear 27 is also mounted on suitable bushings on the shaft 14, so that the gear can remain stationary as the shaft 14 and the frame 12 rotate.

Each of the shafts 34 has a crank arm 38 fixed at an end thereof on an opposite side of the frame 12 from the gears 27 and 28. Crank arms 38 are used to control movement of a carton pickup assembly indicated generally at 40, mounted at an outer end of a slider shaft 42. The slider shaft 42 is reciprocated by the crank arm 38 as the crank arm rotates. A crank pin 44 at the end of the crank arm 38 drives the slider shaft through suitable bearings on the crank pin. The slider shaft 42 is slidably mounted in a hub or housing 46 supported at the outer end of an arm 55 forming one arm of a bell crank assembly 48. The hub 46 is pivotally mounted on a suitable pin 50 in bearings, at the end of arm 55 of the bell crank assembly 48. The bell crank assembly 48 in turn is mounted at the inner end of arm 55 on a pivot pin 52 that is secured to the rotating frame 12. A control arm portion 54 is fixed to an arm 55. Control arm 54 has a cam follower roller 61 at its outer end (see FIG. 2A) on an opposite side of the arm 54 from that shown in FIG. 2. The roller rides in a cam track 60 formed in the side of the plate 12 and will move along the cam track 60 to cause the arm 55 and thus hub 46 to move in a desired path as the crank 38 rotates.

As the crank arm 38 rotates about the axis of the crank pin 34, it will cause the slider 42 to move in and out relative to the slider hub 46. Because of the needed geometry for the operation of the carton pickup assembly 40, the cam track 60 is provided to permit the arm 52 of the bell crank to move about the axis of the mounting pin 52, which causes the arm 55 to move and control the position of the carton pickup assembly.

The outer end of the slider 42 supports the carton pickup assembly 40, which includes vacuum cup frame assembly 64. The vacuum cups are provided with a vacuum through a hose in a conventional manner, as can be seen schematically in FIGS. 5 and 6. Suitable vacuum is provided through a control manifold 68 that transfers both vacuum and air under pressure, as will be explained. The vacuum hoses are just shown schematically at 69 in FIGS. 5 and 6, because they are conventionally used.

The vacuum cup frame 64 includes a main cross member 70 that is supported fixedly on a threaded portion and nut at the end of the slider shaft 42. The cross member 70 thus reciprocates in and out with slider shaft 42 as the crank 38 rotates when above frame 12 is rotating. The position of the cross member 70 is selected to mate with the carton store 13 for holding the cartons 11 at a pick position, to position above a conveyor which is shown schematically in FIG. 6.

The cross member 70 carries a pair of vacuum cups 72 (or more) that are spaced apart a suitable distance and have cup edges that lie on a common plane that is the plane of an exterior surface of a carton 11.

Figure 2A:
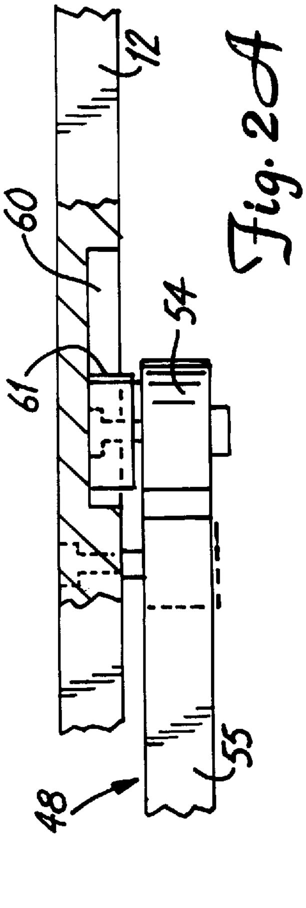
FIG. 2A is a fragmentary sectional view of a guide slot for controlling arm movement taken on line 2A—2A in FIG. 2.
Figure 5:
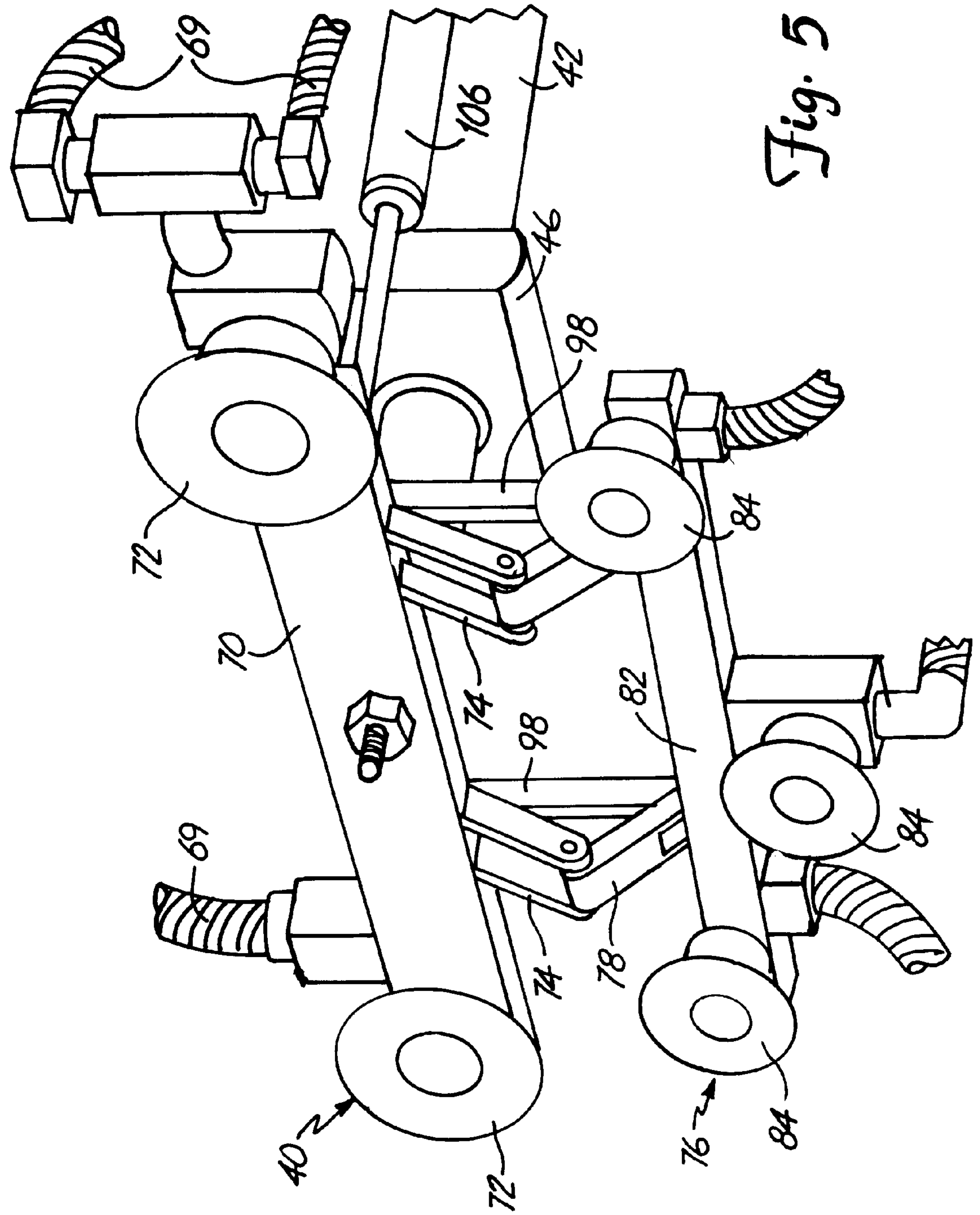
FIG. 5 is a schematic perspective view of the linkage of the present invention in a carton receiving position.
Figure 6:
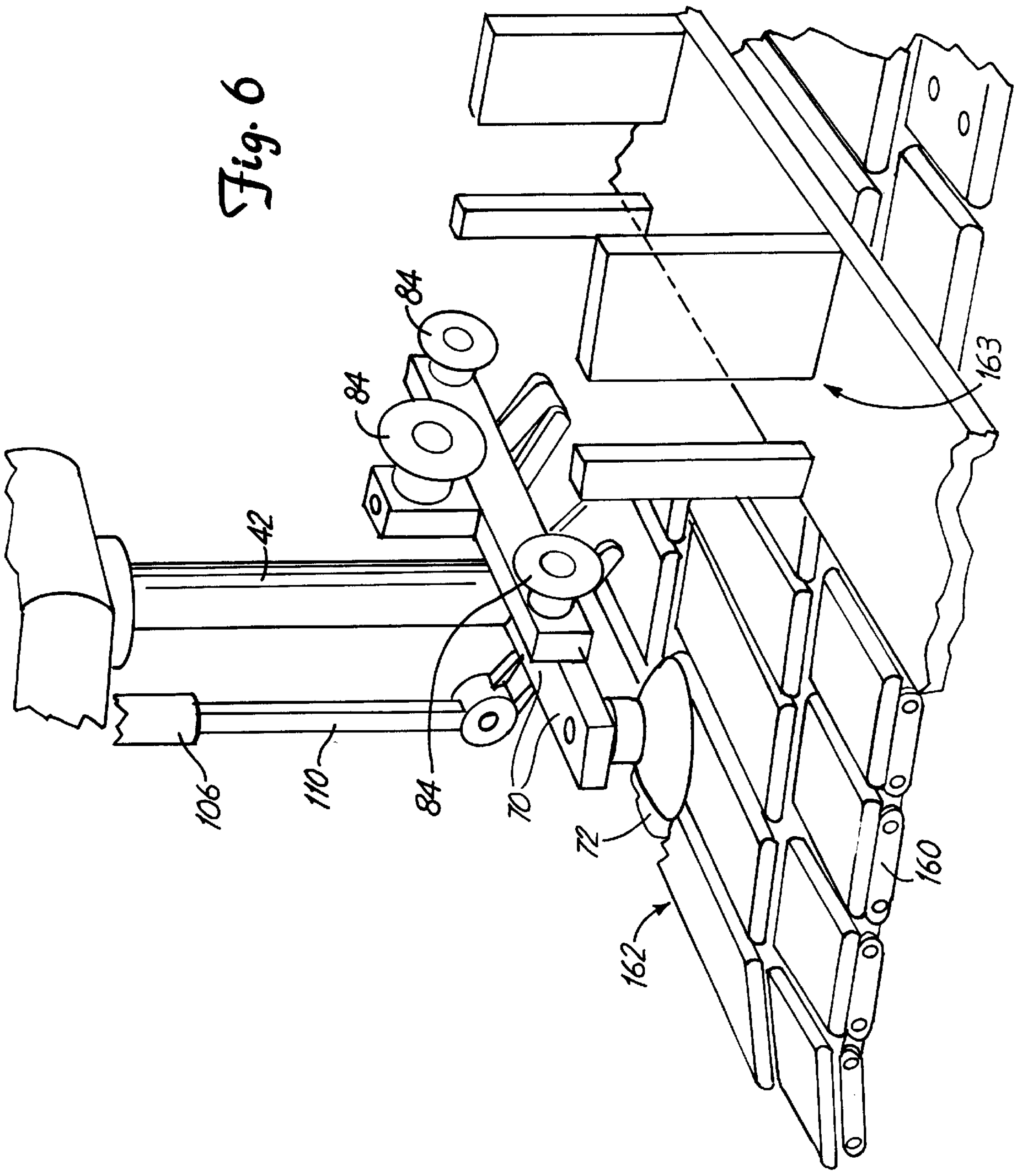
FIG. 6 is a schematic perspective view of the device in the present invention in a position where it will deliver a carton with a folded flap to a conveyor.

The cross member 70 has a pair of depending brackets 74 fixed thereon as can be seen in FIGS. 2 and 2A. These brackets in turn support a carton flap folding assembly 76. The carton flap folding assembly 76 includes a pair of pivoting angled brackets 78 that as shown have angularly offset portions. The brackets have mounting shank portions 80 that adjustably mount an auxiliary vacuum cup cross member 82. The mountings can be adjusted as to length. The cross member 82 in turn mounts suitable vacuum cups 84. As shown in FIGS. 5 and 6 there can be three such vacuum cups 84, and each of them is connected to a suitable vacuum line 69 in a normal manner coming from the manifold assembly 68.

The position of the flap folding vacuum cup cross member 82 about the pivots of the pins 79, which mount members 78 in position is controlled by a control linkage indicated generally at 86. The control linkage 86 includes a pair of arms 88, 88 which are fixed to the cross member 70 in a suitable manner. The arms can be welded to the cross member 70 or can be integrally cast with the cross member. The support arms 88 extend away from the plane of the vacuum cups 84 and the carton 11, and toward the support hub 46 for the slider shaft 42. The support arms 88 in turn mount a pivoting shaft 90, at outer end of the arms. The shaft 90 pivots relative to the arms. The shaft 90 forms a bell crank pivot for an arm 92 fixed to one end of the shaft. A pair of long actuator arms are also fixed to the shaft 90 and move when arm 92 pivots the shaft. A short actuator arm 96 is also attached to the shaft 90 and is positioned between support arms 88.

The long actuator arms 92 are pivotally connected to links 98 through a suitable pivot pin 99. The links have opposite ends connected through pivot pins 100 to brackets 102 fixed to carton flap folding assembly cross member 82.

Figure 3:
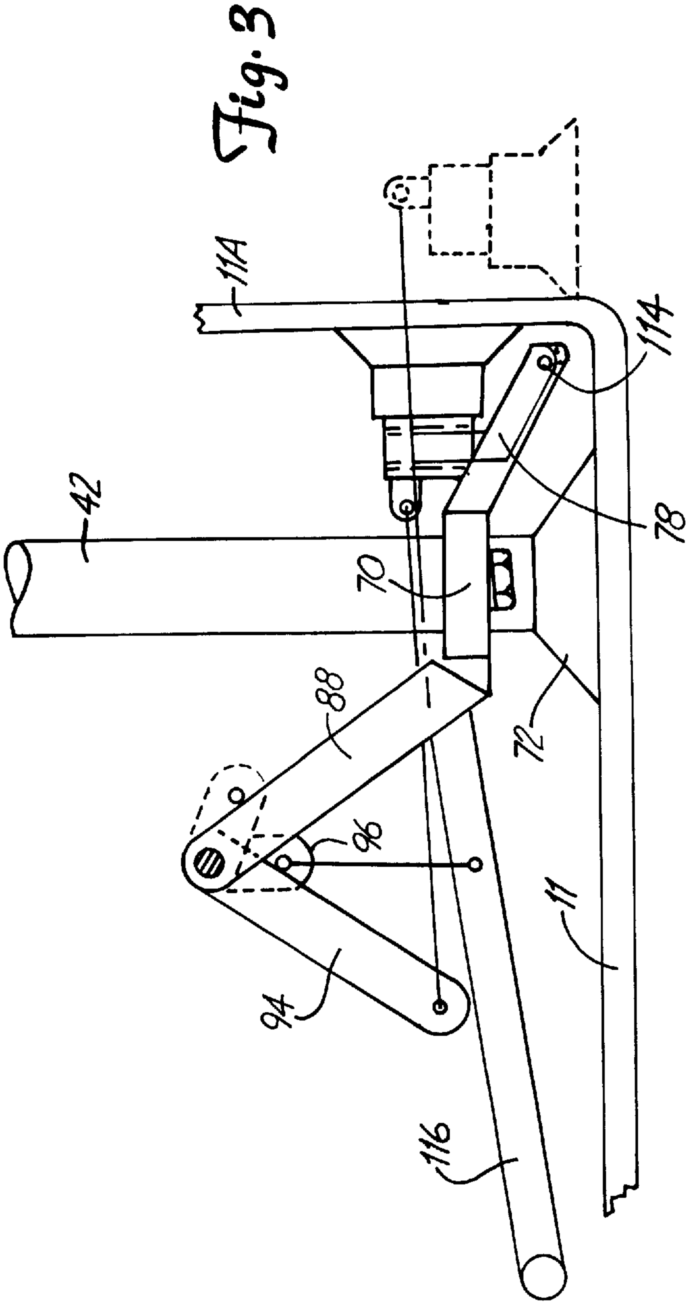
FIG. 3 is a fragmentary enlarged side elevational view of a vacuum cup linkage mechanism used with the present invention in an actuated position.

The actuator arm 92 is operated through the use of a double action fluid pressure actuator 106, comprising an air cylinder that is mounted at a base end on a support arm 108. The actuator 106 is held in this position so that it cannot rotate about the pin mounting at the base end. The actuator 106 in turn has an extendible and retractable rod 110 with a rod end 112 that connects through a suitable pin to the actuator arm 92. In the position shown in FIGS. 2 and 3, the auxiliary carton flap folding vacuum cup lies on a plane with the edges of the vacuum holding cups 72.

When the rod 110 is extended, under suitable control as will be explained, the actuator arm 92 will move forwardly position represented in direction by the arrow adjacent the rod end 112 in FIG. 2, and this will cause shaft 90 to pivot, moving the long actuator arms 94. The arms 94 pull the link 98 upward to a position wherein the cross member 88 is in the location shown in solid lines in FIG. 3. This will move the vacuum cups 84 to move substantially 90° and to hold a flap represented in dotted lines in FIG. 3 to a 90° position from the main portion of the carton. This will be done in a desired location during the cycles or rotation of the rotary frame 12. The pivot axis indicated at 114 in FIG. 3 between the flap folding frame 76 and the support brackets or hubs 74 will be located in a position where axis will lie even with a score line of a carton 11 that is held in the vacuum cups 72. When the vacuum cups 84 move to the position shown in FIG. 3, the fold will come be made at the score line. It should be noted that the score line is actually offset forwardly (or downwardly) slightly from this pivot, but the score line will fold around the end of the brackets so that a neat, useable fold of the flap indicated at 11A in FIG. 3 will be made.

The short actuator arm 96 is used for controlling a breaker bar 116 pivoted on a shaft 117 that is supported on arms 88 through a link 118 that will push a carton held by the vacuum cups 72 away from these cups at the time of folding the flap and aid in release of the carton when it is in its position adjacent the conveyor as shown in FIG. 6. The vacuum to the vacuum cups 72 and 84 will be released when the carton is properly placed.

Figure 7:
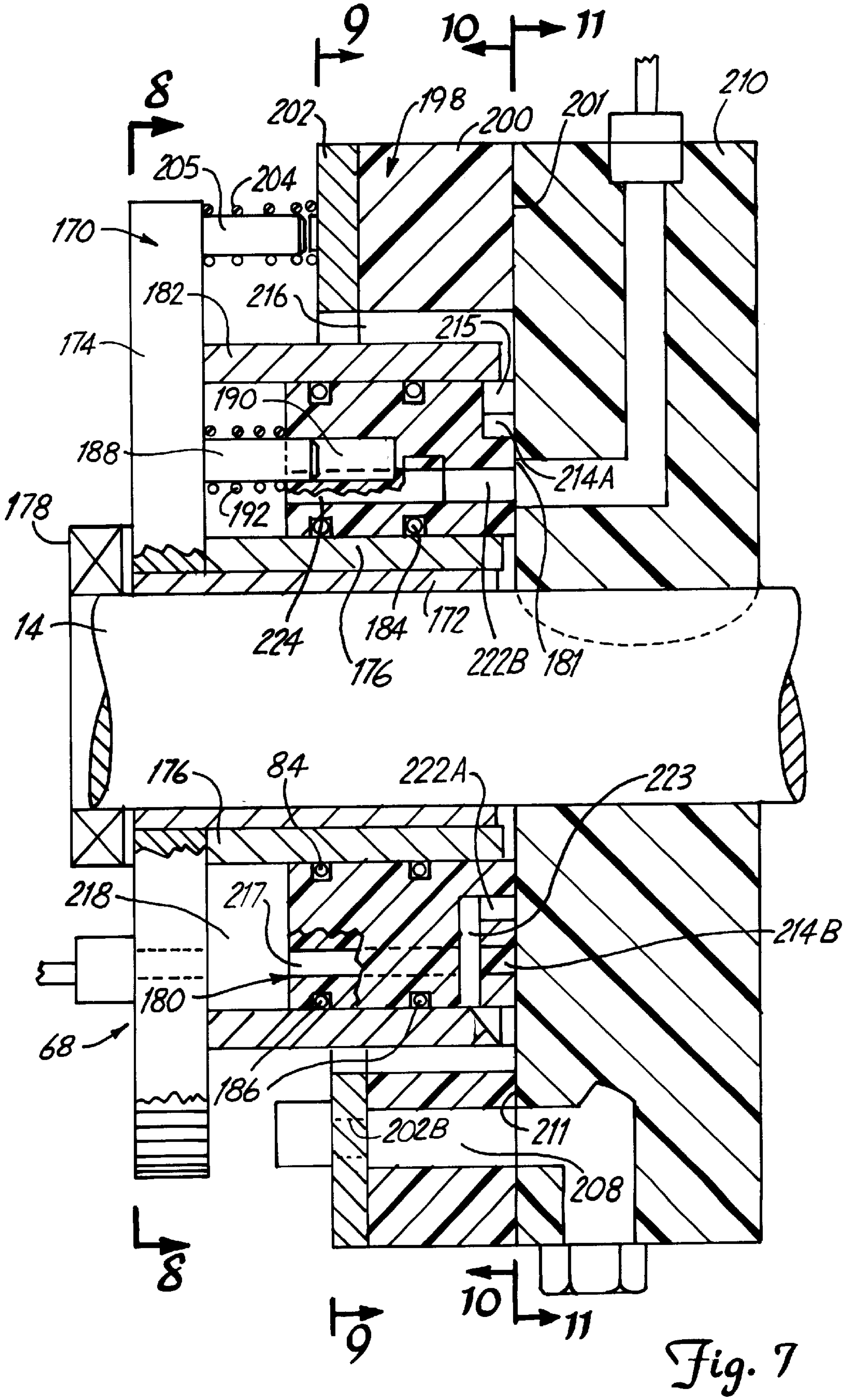
FIG. 7 is a sectional view of a manifold used for transferring both vacuum and air pressure to a rotary placer with parts in section and parts broken away.
Figure 8:
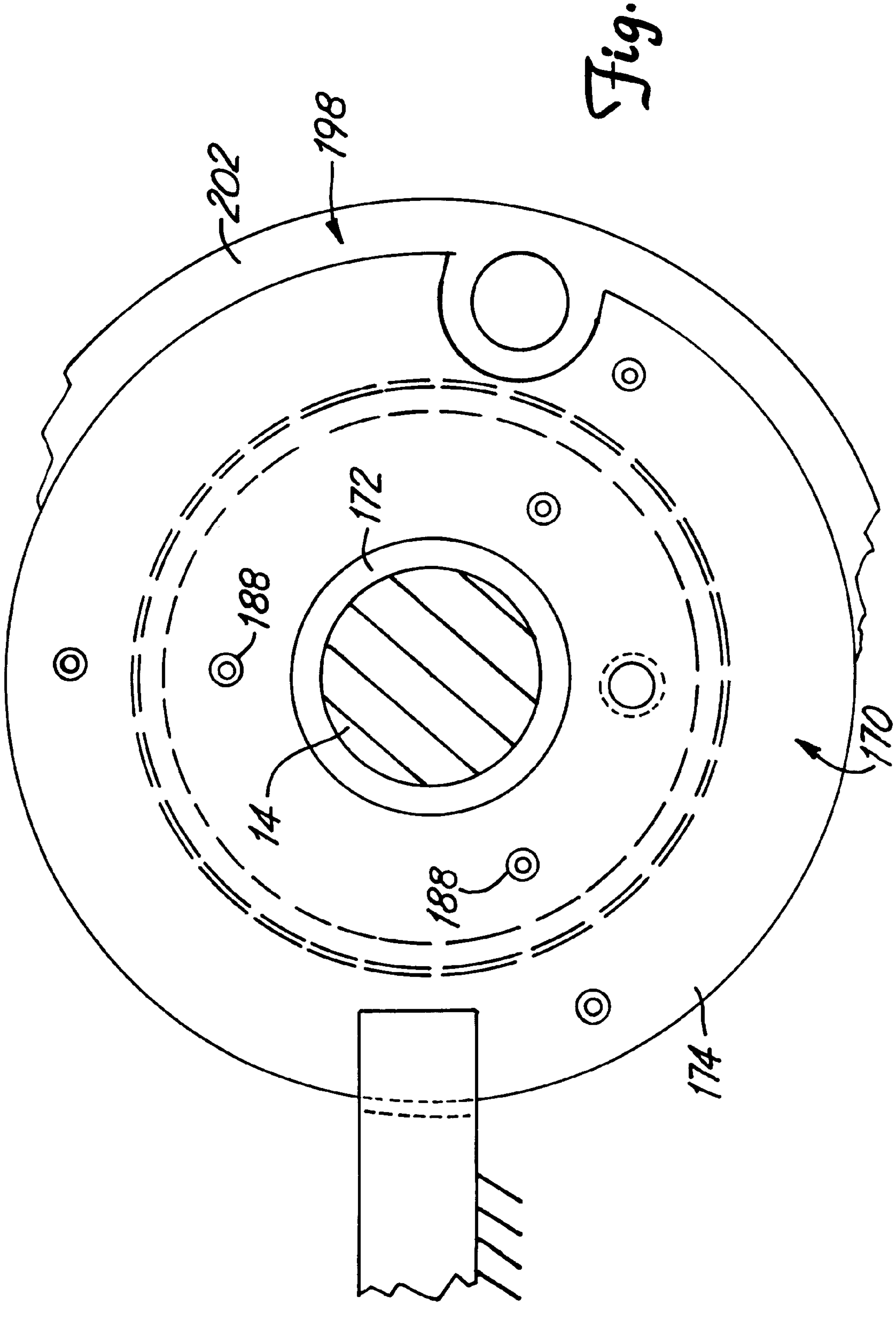
FIG. 8 is a view taken as on line 8—8 in FIG. 7.
Figure 9:
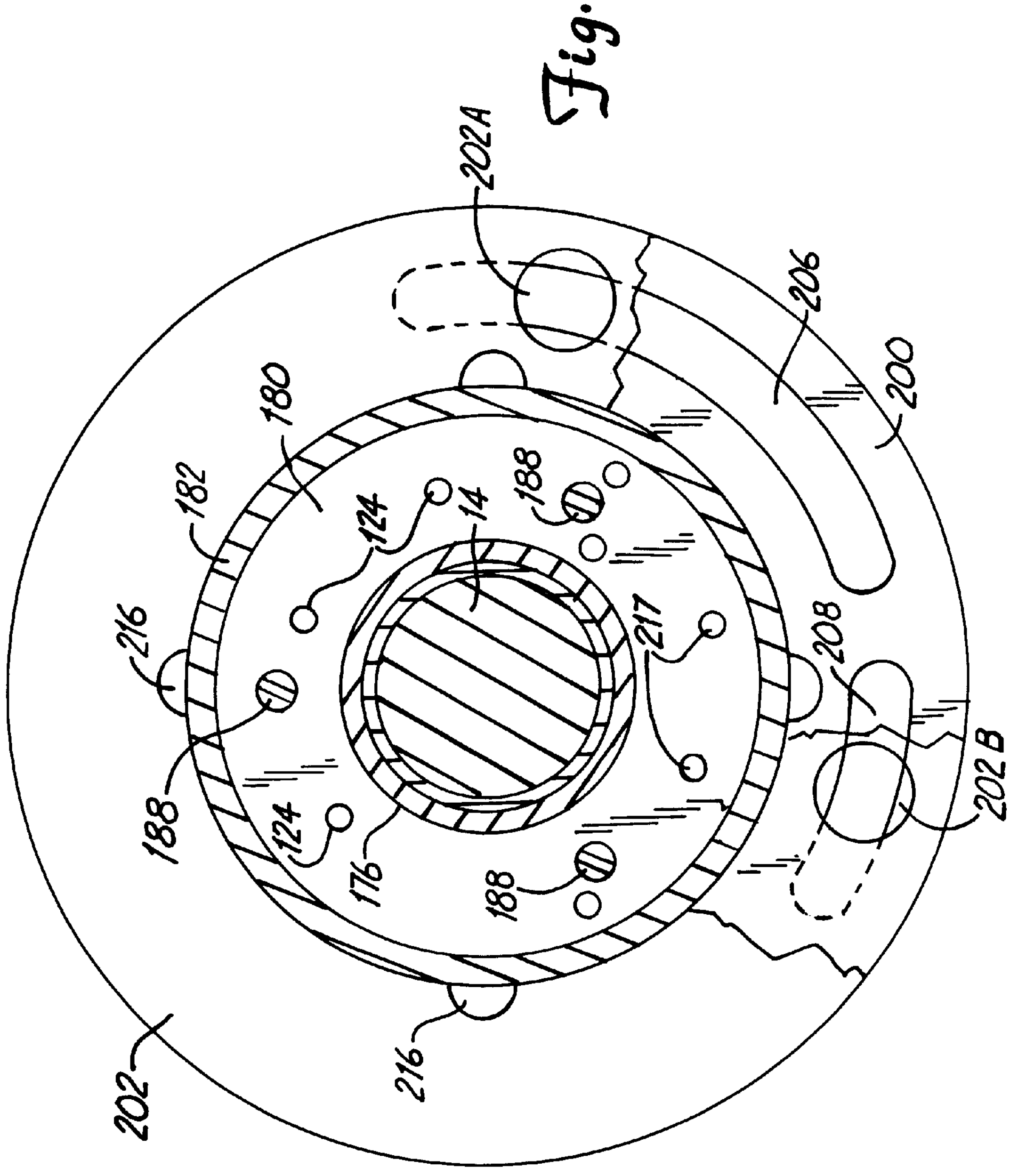
FIG. 9 is a view taken as on line 9—9 in FIG. 7 with parts broken away to show a second portion of the assembly.

The vacuum-fluid pressure manifold assembly 68 is shown in FIGS. 7 through 11. Referring specifically to FIG. 7, the manifold assembly 68 is mounted onto the main shaft 14, and includes a non-rotatable or stationary hub 170, which is rotatably mounted on the shaft 14 through a suitable bushing 172. The hub 170 has an end plate 174, and a sleeve like hub 176 surrounding the bushing 172. A thrust bearing 178 is fixed adjacent the end of the shaft 14 and is used for reacting the loads that are created on plate 70, as will be explained, between the rotating and stationary portions of the manifold assembly 68. A pressure valve piston 180 is mounted on the interior of an outer support ring or sleeve 182 that is also fixed to the plate 174 on an opposite side from bearing 178. The sleeve or ring 182 is concentric with and spaced radially outwardly from the hub 176.

The piston 180 has an inner cylindrical surface that rides on the outer surface of the sleeve like hub 176, and is provided with a pair of O-rings indicated at 184 that are spaced axially, and slidably seal against the hub 176. The outer surface of the piston 180 is slidably mounted on the interior of the support sleeve or ring 182 and is also sealed relatively to the interior surface of the sleeve 182 with a pair of O-rings shown generally at 186.

The piston 180 is slidably mounted for axially movement in direction along the axis of the shaft 14, and is held from rotation relative to the hub on a plurality of pins 188 that are fixed in three radial locations around the central axis of the plate 174. The pins 188 are slidably mounted in suitable receptacles or bores 190 formed in the side of the piston that faces the plate 174. A spring 192 is mounted on each of these pins 188 and provides a resilient urging tending to move the piston along the inner surface of the sleeve 182 and the outer surface of the hub 176 away from the plate 174.

The hub plate 174 is also used for supporting a vacuum valve ring indicated generally at 198. The vacuum valve ring 198 includes a low friction material portion 200, which can be a suitable plastic, and a steel plate 202 that is used for a backing plate.

The valve ring 198 is used for providing ports or openings (see FIG. 9) for threading in vacuum fittings. These bores are shown at 202A and 202B in FIG. 9, and serve the function of providing a vacuum from a source to the rotating portions of the rotary pick and place unit, as well as providing for a vacuum exhaust.

The vacuum valve ring 198 is held from rotation in a suitable manner relative to the hub 170, and is urged axially away from the plate 174 through the use of springs 204 that are mounted onto pins 205 located radially outwardly from the pins 188.

Figure 10:
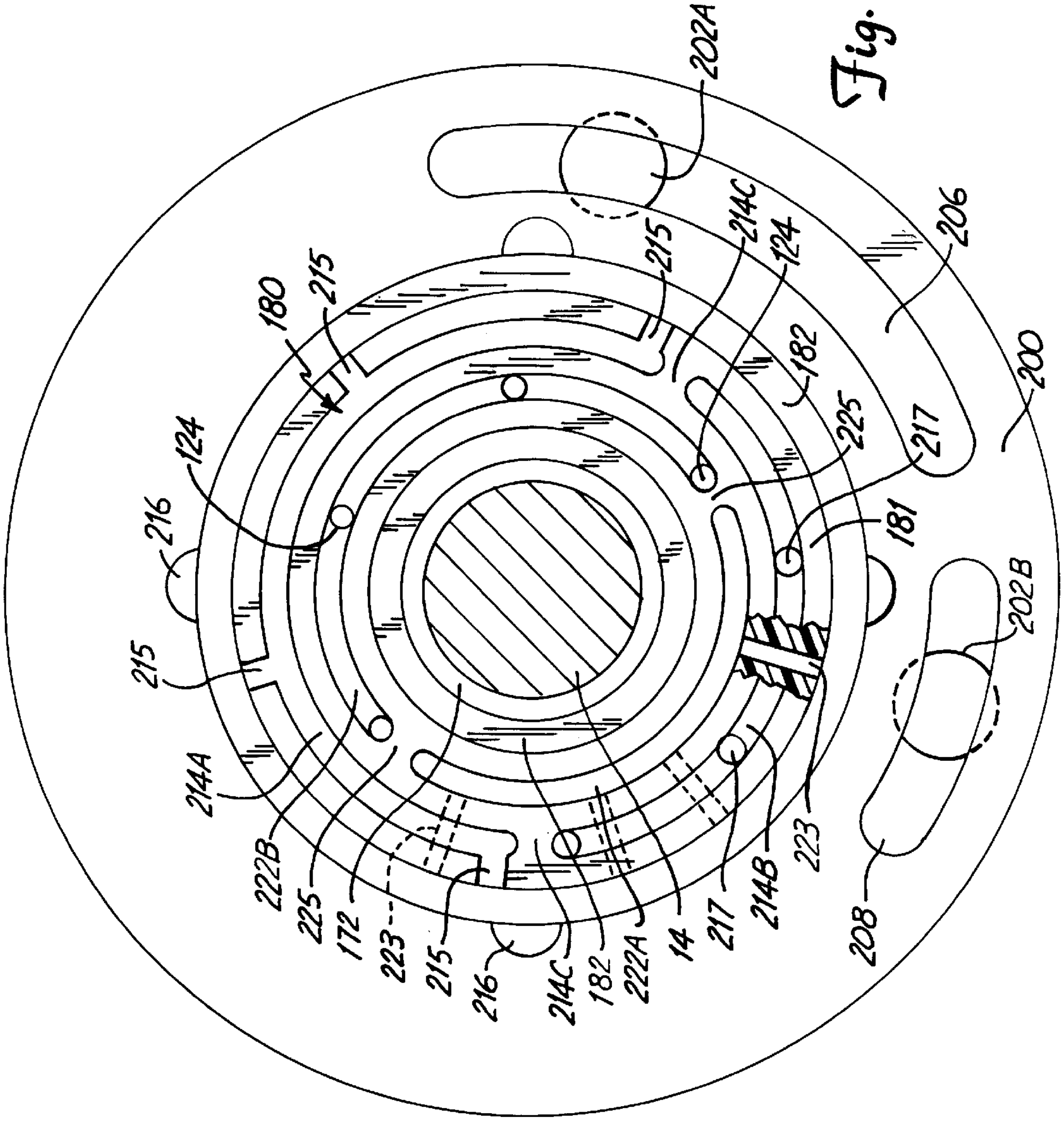
FIG. 10 is a sectional view taken as on line 10—10 in FIG. 7.

The vacuum valve ring portion 200 has a pair of part annular slots defined therethrough, and these are on the opposite side of the steel backing plate 202, as shown generally in FIG. 10, from ports or bores 202A and 202B and open to the bores 202A and 202B. These slots indicated at 206, which is a long part annular slot that extends all the way through the unit, and a vacuum relief slot or exhaust slot indicated generally at 208 that is relatively shorter.

The surface 201 of the vacuum valve portion 200, and the surface 181 of the piston 180 face in the same direction and are coplanar in use. Both surfaces 181 and 201 ride against a mating surface 211 of a distribution manifold section 210 that is fixed in position on the shaft 14 and rotates with the shaft. Set screws and a drive key are used for fixing the manifold section in position. For example, set screws 213 can be used for clamping onto the shaft 14 axially. A drive key is used to drive the manifold section.

The piston 181 for the pressure actuation is made of a suitable low friction material such as plastic as well, and the distribution manifold section is made of steel but has a smooth surface against which the plastic parts ride to effect a fluid pressure seal as the manifold section rotates with the shaft 14.

The valve slots 202A and 202B in the vacuum valve section 200 extend all the way through to the surface 201, and as will be explained open to suitable ports in the manifold section 210 as the manifold section rotates.

As perhaps best seen in FIG. 10, the piston 180 is provided with a number of annular grooves on the surface 181, that are used for carrying pressure to the manifold section 210. Since the actuators 106 for actuating are double acting, it is necessary to provide a pressure connection to opposite ends of the actuators. In other words, pressure to a base end of an actuator 106 will cause the rod to extend, but at the same time an exhaust passage has to be provided at the port at the rod end of the actuator 106. This is done by having a part annular groove for carrying fluid pressure to or permitting pressure to bleed from the base end port of the actuators 106, and separate part annular groove sections, spaced at a different radial location, for carrying the pressure to or from the rod end of the actuators 106. As shown in FIG. 10, a first part annular groove section indicated at 214A is used for permitting air to exhaust from the base end of the cylinders, and is called an “extend” pressure exhaust. This groove 214A has a number of radially extending passageways 215 that discharge to the periphery of the piston 180 and then are capable of being bled out of the manifold through passageways 216 adjacent the inner diameter of the vacuum valve ring section 200 and its backing plate 202.

On the same radius, but separated therefrom, a second base end groove 214B is provided in surface 181 as a pressure providing groove for the base end of each of the actuators 106, and this groove 214B has a plurality of passageways 217 that extend axially, and as shown in FIG. 7 communicate with a sealed plenum 218 formed within support sleeve 182 and between piston 181 and plate 174. The plenum 218 is connected to communicate a source of pressure 220. The groove or recess 214B is separated from the ends of the groove or recess 214A with a surface portion 214C (which is part of surface 181) at opposite ends thereof. The grooves 214A and 214B are positioned so that there is proper timing for holding the base end of the respective actuators 106 under pressure to extend the appropriate rod for actuating the bracket that controls the auxiliary vacuum cups 82 to pull the carton flap substantially 90° at the proper position.

A part annular groove 222A is formed in piston 180 radially inwardly from the groove sections 214A and 214B, and the part annular groove 222A has a plurality of exhaust passageways indicated at 223 to bleed to the exterior of the piston 180, and thus also exhaust to the atmosphere when it is desired to extend the rod of the actuator 106. Annularly aligning (at the same radial position), part annular groove 222B is the pressure carrying groove for providing pressure to the rod end of the actuators 106. As can be seen, groove section 222B is at the same radially distance as the groove section 222A and has a plurality of pressure ports 224 formed axially in the piston 181, and leading to plenum 218 and source of pressure 220. It should be noted that the part annular groove 222A providing exhaust for the rod end of the actuators 106, overlaps one portion of the groove section 214A that provides exhaust for the base end of the actuators in order to obtain proper operation. The positions where pressure is applied to either the rod or the base end of the actuator is also selected by the length of the groove sections 222A and 222B. The part annular groove sections 222A and 222B are separated by surface portions 225, to provide a time when there would be no pressure or exhaust provided to the port on the rod end of the actuator.

Figure 11:
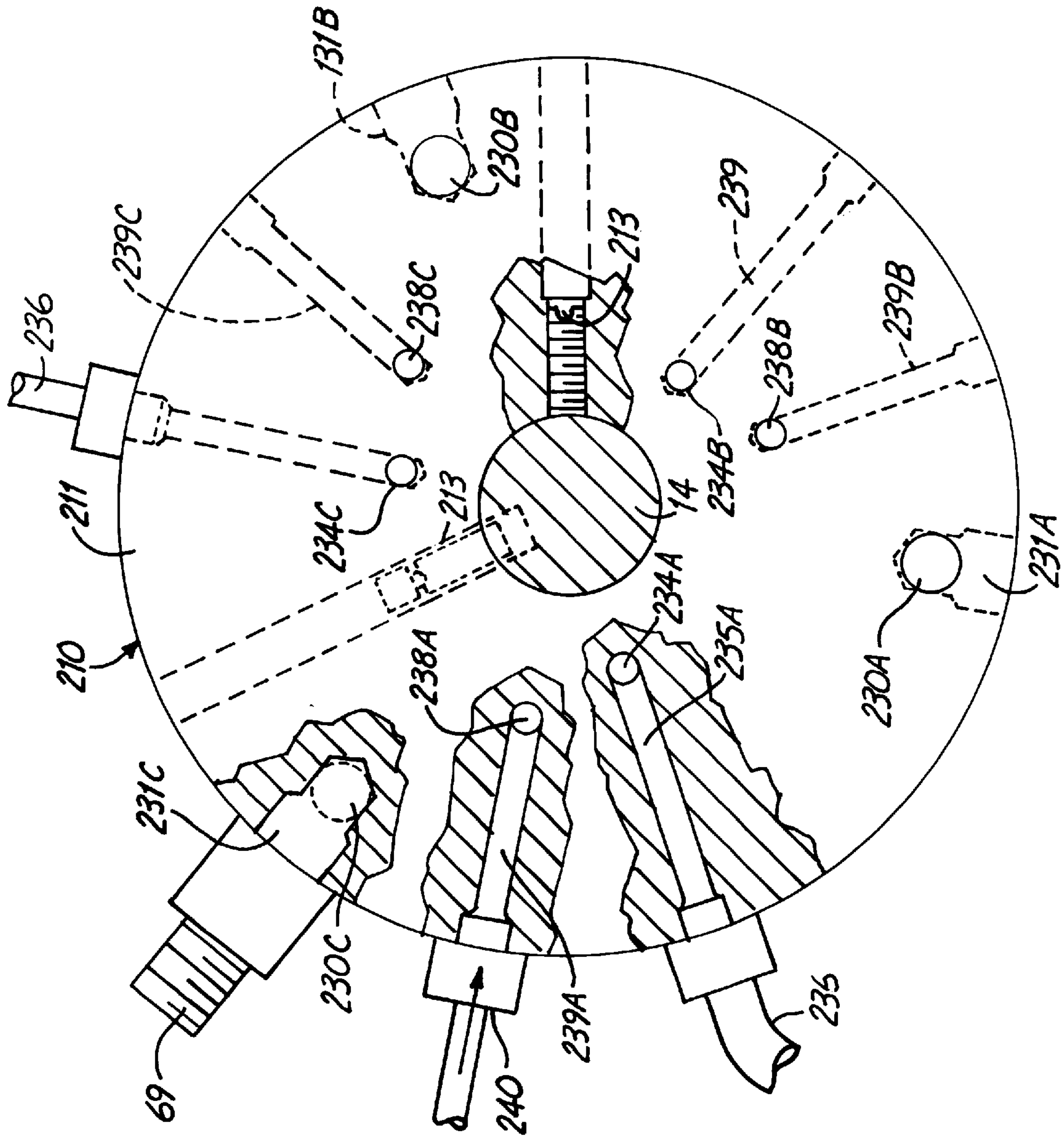
FIG. 11 is a sectional view taken as on line 11—11 in FIG. 7, which is the same line as the view of FIG. 10 but looking in an opposite direction.

The distribution manifold section 210 for both vacuum and pressure receives the pressure and vacuum from the piston pressure valve 181 and vacuum valve ring 198, respectively. As shown in FIG. 11, the distribution manifold section 210, which rotates with the shaft 14 and which has the surface 111 that is formed flat and true and is used as a sealing surface relative to the piston 181 and vacuum valve 198 is provided with three vacuum outlet ports indicated generally at 230A, 230B and 230C, and each of these ports is made for use with one of the actuators 106 and the associated vacuum cups. The vacuum ports 230A, 230B and 230C are each connected through a radial bore 231A, 231B and 231C to the exterior or peripheral surface 232 of the distribution manifold section.

Additionally, the distribution manifold section 210 has a set of retract pressure ports which essentially are rod end pressure ports 234A, 234B and 234C, which are the same radial distance out from the center of shaft 14 as the respective groove portions 222A and 222B on the piston pressure valve 180. That means that as the piston pressure valve 180 is held stationary and the distribution manifold section rotates past the groove sections 222A and 222B, the ports 234A, 234B and 234C will alternately be provided with fluid under pressure from the source 220 through the piston grooves and as they rotate past groove section 222B will be permitted to exhaust to atmosphere through the radial passages 223 that open to the groove section 222A. The outer ends of each of the radial bores 235A, 235B and 235C, which are open to the ports 234A–234C is provided with a threaded outer end for attaching suitable pressure lines such as that shown at 236 through a suitable fitting. There are separate pressure lines to each of the passageways 235A–235C leading to a separate one of the actuators 106 for the separate vacuum cup assemblies.

The base ends of each of the actuators 106 is provided with the fluid under pressure, or connection to exhaust passageways through a plurality of axially extending ports 238A, 238B and 238C that are spaced radially outwardly from the center of rotation of the shaft 214 a greater distance than the ports 224, so that the ports 238 align with the part annular grooves 214A and 214B. The ports 238A–238C are connected to radial passageways 239A, 239B and 239C that have threaded ends for connection to suitable threaded fittings such as that shown at 240, which provide pressure lines connected to the base ends of the respective actuators 106.

Since the distribution manifold section 210 rotates with the shaft 214, it also rotates with the frame that supports the vacuum cup assemblies, so that the transfer of fluid pressure between the stationary member and the rotating member occurs right at the interface between the surfaces 181 and the surface 211. By having the part annular grooves 214A and 214B for connection to the base end of the actuators 106, and the grooves 222A and 222B connected to the rod end of the actuators, and then having the arcuate length of the grooves properly arranged for the three ports 234A–234C and 238A–238C, respectively, the actuators can be operated at the desired position during the cycles of rotation of frame 12 to pick up a carton, and at the appropriate position the actuator will be extended to cause the auxiliary vacuum cups to "break" or move the flap of a carton to its appropriate position.

The manifold assembly 68 carries both vacuum and pressure, across the same interface surface. This is aided in part by having the vacuum acting at a greater radius from the center of rotation of the stationary and rotating members, than the pressure. The total axial force from the pressure acting in the grooves 214B and 222B is counteracted by the force acting on the piston 180 from chamber 218. The pressure in the chamber 218 is the same as that in the grooves 214A and 222A but the area of the back side of the piston is greater than the area of the part annular grooves. Thus the pressure in the chamber urges the surfaces of the piston and the manifold section together. The vacuum force and the differential pressure force will keep the system sealed, but springs 192 and 204 are used for assuring sealing is maintained.

The vacuum is supplied to the vacuum cups at the appropriate time to pick up the cartons, during a portion of the rotary cycle, and release the vacuum at an appropriate time so the cartons will be deposited on the conveyor appropriately.

The present rotary placer is the first to use pneumatic or air pressure for operating actuators, carried by the rotary device, and at the same to carrying vacuum to vacuum cups for operation.

It should be noted that the hub plate 174 has a recess for permitting a vacuum fitting to be attached directly to the vacuum port of the steel backing plate of the vacuum valve ring.

Figure 4:
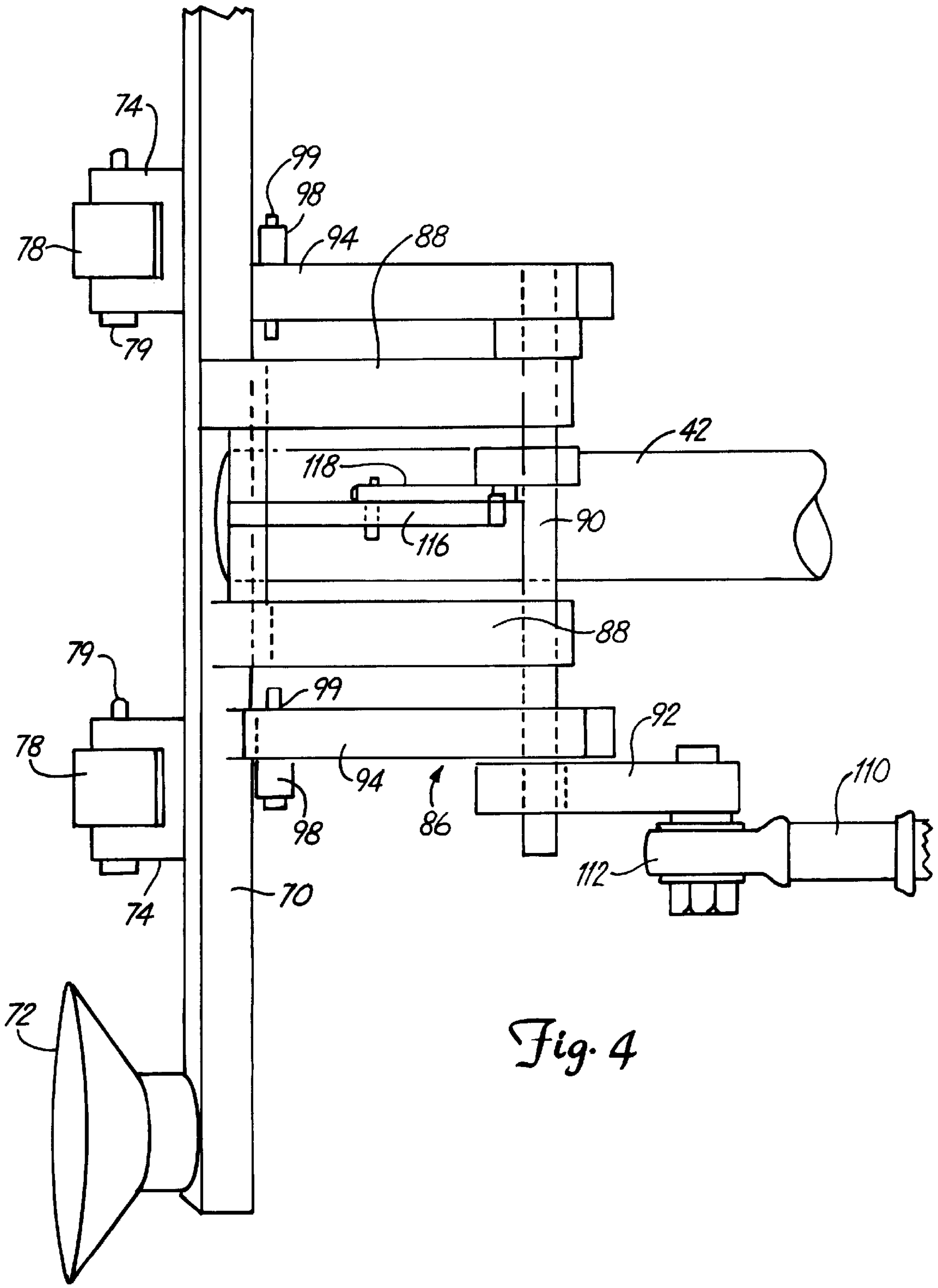
FIG. 4 is a top plan view of the linkage in FIG. 3 in an initial position.
Figure 4A:
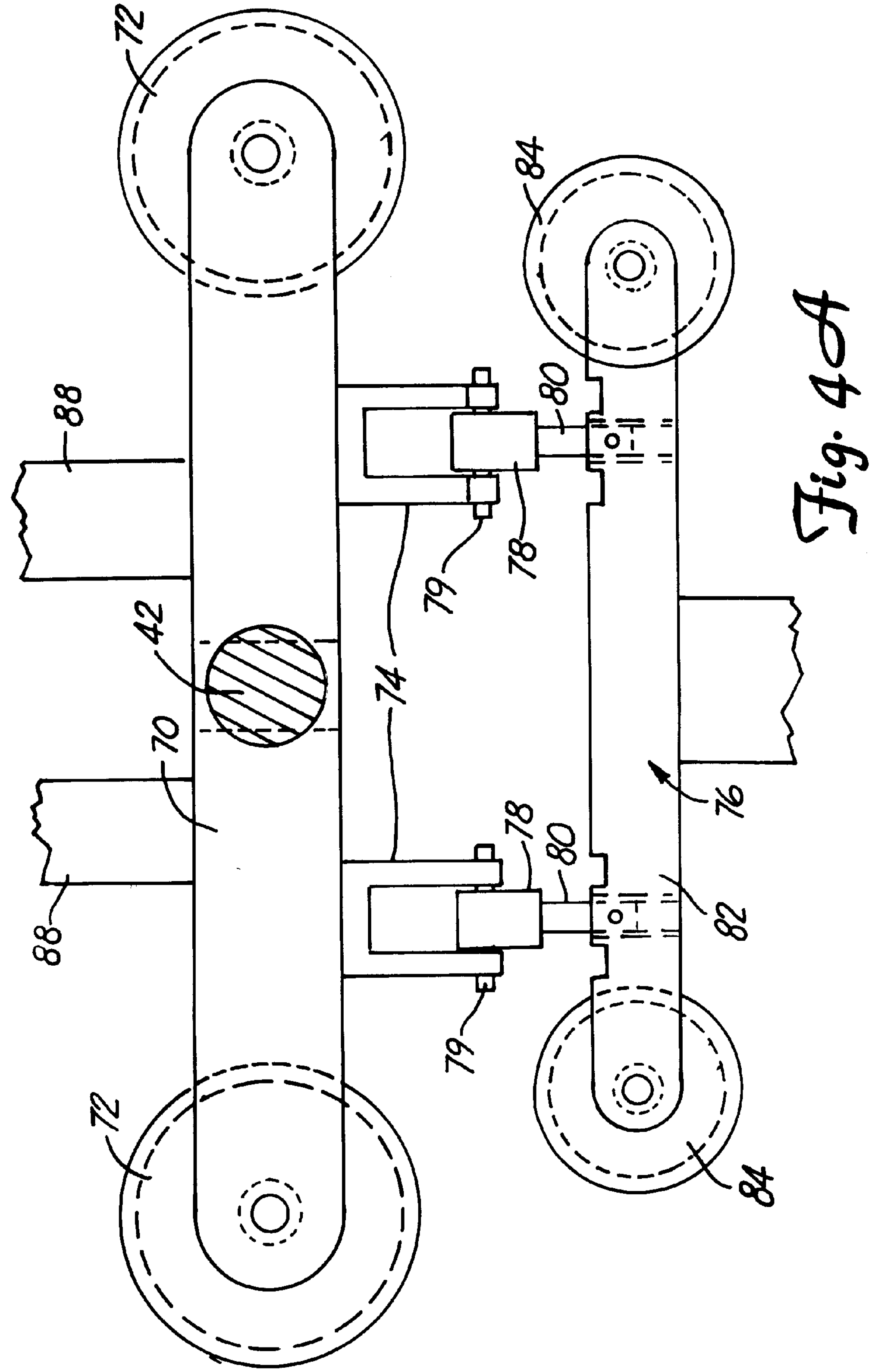
FIG. 4A is a front elevational view of the linkage of FIG. 4.

In FIGS. 6 and 7, the carton handling assembly is shown moved from a pick position wherein all of the vacuum cups 84 and 72 are on a plane to the place position. As can be seen in FIG. 6, the cups are connected with vacuum lines 69 that come from the manifold assembly 68. In FIG. 4 the carton handling components are shown in approximately the position for picking up a carton at a carton store.

FIG. 6 is a perspective view with the carton handling assembly 40 after rotating from the pick position to the place position. The auxiliary or flap folding vacuum cups have moved 90° to hold a flap 11A that is shown only schematically on one part, with the main part of the carton held as shown with a fragmentary portion 11B. In FIG. 6, the conveyor chain 160 for a carton loading machine 162 is shown, and a guide or pusher 163 as illustrated. The flap would be lifted to its folding position for transporting by the conveyor 160.

Although the present invention has been described with reference to preferred embodiments, workers skilled in the art will recognize that changes may be made in form and detail without departing from the spirit and scope of the invention.

What is claimed is:

1. A valving manifold assembly for transferring fluid pressure between a stationary frame and a rotary frame comprising a distribution manifold section connected to rotate with the rotary frame, a stationary manifold hub mounted on the stationary frame and forming part of the manifold assembly, a piston having a cylindrical outer surface carried by and surrounding said hub and having a plurality of part annular grooves on an outwardly facing first end surface thereof which first end surface is perpendicular to an axis of rotation, the part annular grooves having an annular length to provide fluid pressure to ports on the surface of the distribution manifold section aligning with the part annular grooves on the first end surface of the piston during selected portions of rotation of the distribution manifold section, a pressure chamber formed on a second end surface of the piston opposite from the outwardly facing first end surface to provide a force on the piston urging the piston toward the distribution manifold section, the part annular grooves on the first end surface of said piston having a smaller area than the second end surface of the piston, and a conduit for carrying pressure from the distribution manifold section to a remote actuator on the rotary frame to operate the actuator.

2. The apparatus of claim 1, wherein the part annular grooves include fluidly separated first and second part annular grooves for operating a double acting fluid pressure actuator on the rotary frame, a first part annular groove being spaced radially outwardly from a second part annular groove in said piston, and said first part annular groove at one radial position having a groove segment for permitting sequentially pressurizing and connecting to exhaust a port at a first end of the remote actuator, and the second part annular groove having a groove segment permitting sequentially pressurizing and connecting to exhaust a port on a second end of the remote actuator.

3. The apparatus of claim 1, wherein said hub is mounted onto a rotating shaft on which said rotating manifold section is mounted, said rotating manifold section being drivably mounted on the shaft, and said hub being rotatably mounted relative to the shaft, said hub being restrained from rotation.

4. The manifold assembly of claim 3 and a thrust bearing secured on said shaft to carry thrust loads in a direction axially along the shaft exerted on the stationary hub from axial forces between the hub and the piston urging the piston toward the rotating manifold section.

5. The manifold assembly of claim 3, wherein said rotating shaft drives a rotary placer for handling cartons and having a pickup head for moving cartons from a first position to a second position, said pickup head having vacuum cups thereon for engaging a carton, and having at least a portion that is actuable by the actuator, said manifold assembly having vacuum connections for carrying vacuum to the vacuum cups synchronized with the grooves providing fluid pressure to the actuator.

6. The manifold assembly of claim 1, wherein said stationary hub includes a first cylindrical sleeve rotatably mounted over a rotating shaft carrying the rotating manifold section, and a second concentric cylindrical sleeve having a cylindrical interior surface spaced radially outward from and defining a space relative to an exterior surface of said first cylindrical sleeve, said piston being ring shaped and having an interior bore surface sealingly mounted on said first sleeve, and an exterior surface of said piston being cylindrical and slidably sealed relative to the cylindrical interior surface of the second sleeve, said piston being slidable in an axial direction of the shaft relative to the first and second sleeves.

7. The manifold assembly of claim 6, wherein the hub further includes a backing plate supporting the first and second sleeves, and wherein the piston has an axial length that is less than the axial length of the first and second sleeves, the piston forming a chamber between the backing plate and the piston in the region formed between the first and second sleeves, and a source of fluid pressure open to the chamber.

8. The manifold assembly of claim 7, including passageways for connecting the chamber to selected part annular grooves on the outwardly facing first end surface of the piston.

9. The manifold assembly of claim 6, wherein there are two groove segments for each of the first and second part annular grooves and at least one groove segment of each part annular groove being connected by radially extending exhaust passageways to an exterior surface of said piston.

10. The manifold assembly of claim 2, wherein the first part annular grooves form groove segments that are separated from each other by a portion of the outwardly facing first end surface of the piston, ends of said groove segments being positioned to connect the groove segments to respective ports on the actuator at desired positions of rotation of the distribution manifold section.

11. A manifold assembly for transferring both fluid vacuum and fluid pressure across a rotating joint comprising a first frame and a second frame rotatably mounted relative to each other, a manifold hub mounted on the first frame and forming part of the manifold assembly, a piston carried by and surrounding said hub, the piston having a cylindrical outer surface, said piston having a plurality of part annular grooves on a first end surface thereof, a distribution manifold mounted on said second frame and movable therewith, the distribution manifold having a distribution manifold surface mating with end surface of the piston and having ports thereon aligning with the part annular grooves on the end surface of the piston during selected portions of rotation of the distribution manifold assembly relative to the hub, a pressure chamber open to a second end surface of the piston opposite from the first end pressure in the pressure chamber providing a force on the piston urging the piston toward the distribution manifold mating surface, the part annular grooves on the first end surface of the said piston having a smaller area than the second end surface of the piston open to the pressure chamber, and a source of fluid pressure selectively connected to the pressure chamber.

* * * * *